United States Patent [19]

Hong

[11] Patent Number: 5,079,997
[45] Date of Patent: Jan. 14, 1992

[54] PISTON SEAL DEVICE FOR A PNEUMATIC CYLINDER

[75] Inventor: Yeh-Sun Hong, Seoul, D.P.R. of Korea

[73] Assignee: Korea Institute of Science and Technology, Seoul, Rep. of Korea

[21] Appl. No.: 557,127

[22] Filed: Jul. 23, 1990

[30] Foreign Application Priority Data

Jul. 27, 1989 [KR] Rep. of Korea ............... 10662/1989

[51] Int. Cl.$^5$ ............................................. F15B 15/26
[52] U.S. Cl. ........................................ 92/23; 92/82;
    92/181 R; 92/183; 92/184; 92/185; 188/67; 277/27
[58] Field of Search ............... 92/174, 175, 181 R,
    92/182–185, 201, 247, 250, 60, 82–83, 127,
    156–157, 112, 115, 160, 23, 24, 27, 28; 277/27,
    34; 188/67, 299

[56] References Cited

U.S. PATENT DOCUMENTS

| | | | |
|---|---|---|---|
| 1,622,043 | 3/1927 | Miller | 92/185 X |
| 3,050,943 | 8/1962 | Thorel et al. | 92/23 |
| 3,176,590 | 4/1965 | Uhtenwoldt et al. | 188/67 |
| 3,400,637 | 9/1967 | Roberts, Jr. et al. | 92/23 |
| 3,665,812 | 5/1972 | Hashimoto et al. | 188/67 |
| 3,962,956 | 6/1976 | Jacobellis | 92/82 X |
| 4,073,217 | 2/1978 | Coun | 92/27 |
| 4,342,336 | 8/1982 | Satterthwaite et al. | 277/34 X |
| 4,579,192 | 4/1986 | Mueller | 277/34 X |
| 4,630,958 | 12/1986 | McCallister | 92/257 X |
| 4,700,925 | 10/1987 | Russak | 92/24 |
| 4,893,699 | 1/1990 | Engelsdorf et al. | 188/299 |
| 4,949,989 | 8/1990 | Kakizaki et al. | 188/299 |

FOREIGN PATENT DOCUMENTS

47701 1/1977 Japan ........................... 92/182

OTHER PUBLICATIONS

Warring, R. H., *Seals and Sealing Handbook*, Houston: Texas, Gulf Publishing Co., 1981, pp. 305–307.

*Primary Examiner*—Edward K. Look
*Assistant Examiner*—Thomas Denion
*Attorney, Agent, or Firm*—Leydig, Voit & Mayer

[57] ABSTRACT

A piston seal device of pneumatic cylinder which satisfies the required tightness of a seal as well as the required lubrication characteristics for a piston movement is disclosed. The piston seal device for maintining different pressures acting on each side of the piston of pneumatic cylinder comprises slide rings located on peripheries of both sides of piston, a seal ring located at the outer part of pressure room formed along the periphery of central part of the piston and operated by pneumatic pressure of the pressure room, and a solenoid valve which operates in selection modes to supply the pressurized air into the pressure room. Slide rings are located with a proper distance at the peripheries of both sides of a piston installed in a pneumatic cylinder and at the center of a piston an expansionable seal is applied. This seal is installed in the outer part of a pressure room formed peripherally along the piston and the pressure room is connected by pressure lines through which high pressure air is supplied by solenoid valves. The seal then is expanded by high pressure air to close the gap between the peripheral surface of piston and the cylinder inner wall.

14 Claims, 2 Drawing Sheets

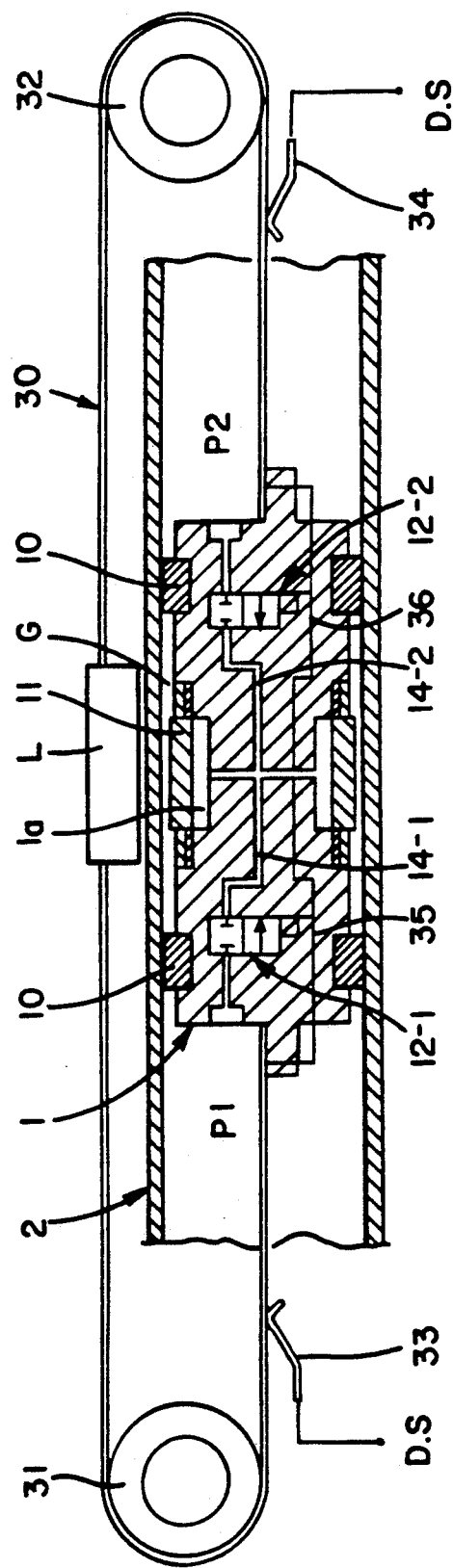
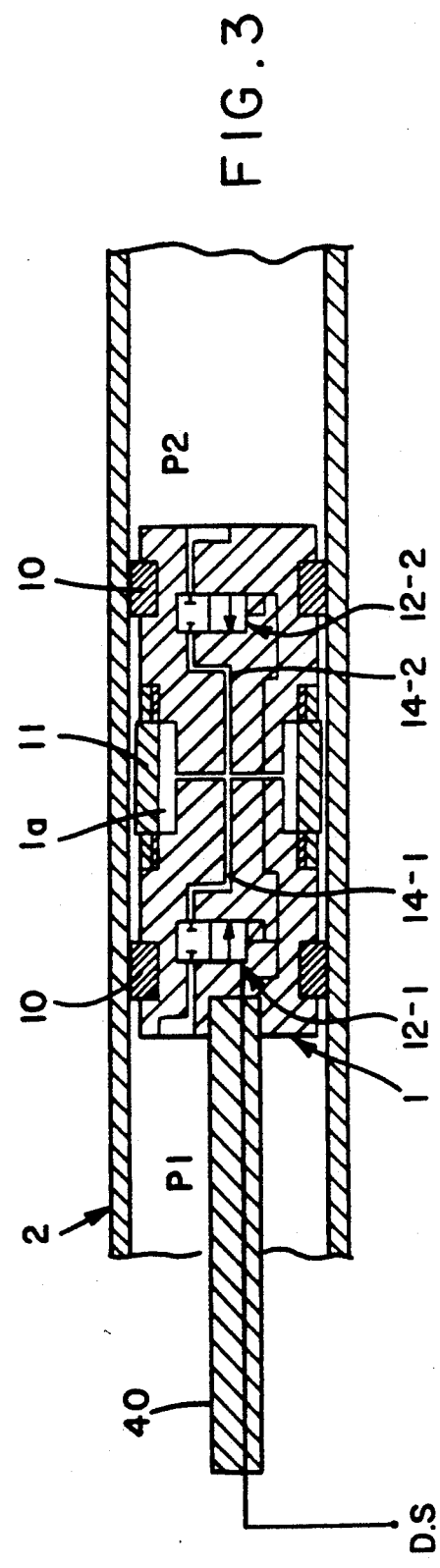
FIG. 2
FIG. 3

PISTON SEAL DEVICE FOR A PNEUMATIC CYLINDER

BACKGROUND OF THE INVENTION

The present invention relates to a seal device of pneumatic cylinder which satisfies the required tightness of a seal as well as the required lubrication characteristics for a piston movement.

In general, a piston seal, which is applied to maintain different pressures acting on each end of piston, should seal off the gap between a piston and a cylinder inner wall, and at the same time, the sliding friction force caused by the seal should be as small as possible.

Usually the sliding friction force caused by a piston seal has the characteristics of such that it has a large value when a piston is at rest and then decreases abruptly with the increase of piston speed up to a certain critical value, and again increases in proportion to the speed once the piston speed exceeds the critical value.

The problems encountered in the piston movement of a pneumatic cylinder are brought out by the friction characteristics of a piston seal in the range of low piston speed, since the decrease of friction force with the increase of piston speed results in the so called stick-slip phenomenon which prevents the piston for a pneumatic cylinder from smooth moving in low piston speed.

SUMMARY OF THE INVENTION

Therefore, an object of the present invention is to provide a seal device which is free from the problems and difficulties explained above.

Further, the present invention aims at the improvement of both the sealing and the braking capabilities when a piston is at rest, and at the elimination of stick-slip phenomenon when a piston moves. That is, by the selective use of the slide rings located on both sides of piston and the expandable member or seal ring located at piston center, the required functions of sealing and braking can be accomplished when a piston is at rest, whereas friction force can be decreased considerably by using slide rings only when a piston moves.

For the embodiment of the above objects, the present invention comprises slide rings made of frictionless material which are located with a proper distance at the peripheries of both sides or ends of the piston installed in a pneumatic cylinder and an expansionable seal which is disposed between the slide rings.

This seal ring is installed in the outer part of the pressure room formed peripherally along the piston and the pressure room is connected by pressure lines through which high pressure air is supplied by a solenoid valve. The seal ring then is expanded by high pressure air to close the gap between the peripheral surface of piston and the cylinder inner wall.

The seal device of the present invention works in such a manner that the seal ring installed at the piston center is used selectively to satisfy both the required sealing and lubrication characteristics simultaneously. When the piston is at rest and the sealing capability is important, only slide rings are employed to improve the friction characteristics and further to eliminate the low speed stick-slip phenomenon.

In addition, the seal device of the present invention can be applied to various types of piston. For an example, by installing solenoid valves which supply or shut the pressurized air to pressure room inside the piston body, the device can be applied to the rodded piston as well as to the rodless piston such as steel belt power transmission type.

BRIEF DESCRIPTION OF THE DRAWINGS

FIGS. 1A and 1B show the structure and function of the piston seal device for pneumatic cylinder according to the present invention, in which FIG. 1A shows a cross-section with the seal contracted when a piston moves, and FIG. 1B illustrates a cross-section with the seal expanded when a piston is at rest, FIGS. 2-3 are exemplary views of the seal device of the invention, in which FIG. 2 is a cross-section the seal device of the invention is applied to a rodless piston pneumatic cylinder, and FIG. 3 is a cross-section of the seal device of the invention utilized in piston having a rod.

DETAILED DESCRIPTION OF THE INVENTION

Figure 1A:
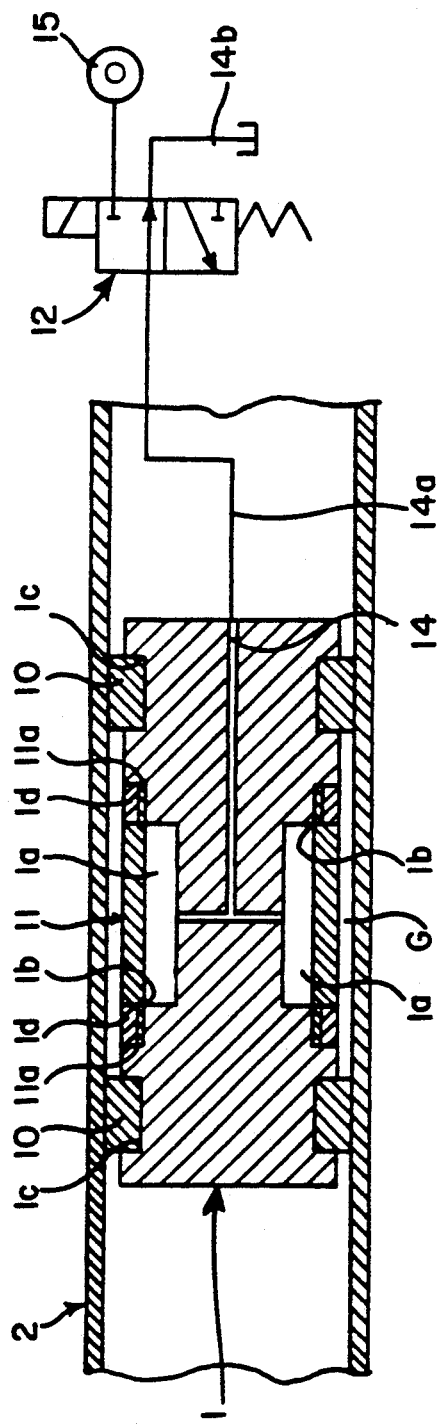
Figure 1B:
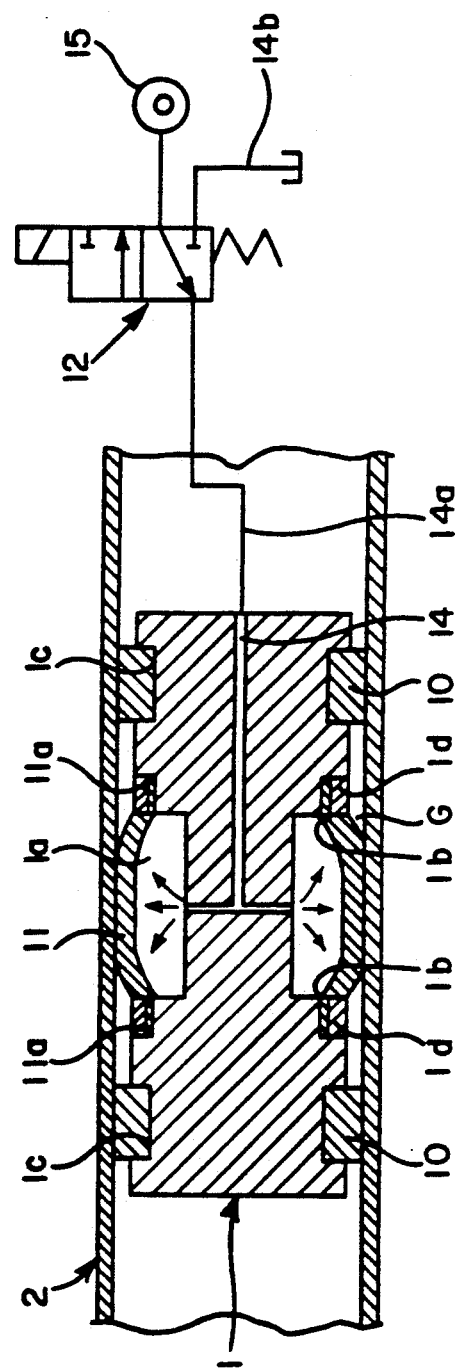

Referring to FIGS. 1A and 1B, the seal device of the present invention comprises slide rings 10 which are located on both peripheral sides of a piston 1, a seal ring 11 which is installed at the outer periphery of the pressure room 1a formed along the periphery of central parts of the piston 1 and is operated by the pressurized air supplied to the pressure room 1a, and a pneumatic solenoid valve 12 by which the pressurized air is supplied or drained for the operation of the seal ring 11 installed in said pressure room 1a.

The body of said slide ring 10 is made of material with good friction characteristics such as used for oilless bearings. The inner part of body is inserted in the circular groove 1c of proper width and depth formed along the periphery of both sides of said piston 1. The outer peripheral surface of each slide ring 10 is always in contact with the inner peripheral surface of the cylinder 2 to form an exact annulus and to keep the relative friction force small.

The seal ring 11 is made of elastic material, which permits a deformation by external forces. Fixing members 11a of proper thickness and width are provided at both ends of inner wall of circular seal 1 body. Also seats 1b are provided at both ends of outer wall of said pressure room 1a in which said seal ring 11 is installed to accommodate the fixing members 11a, and then fixing rings 1d are applied to fix down the members 1a to the seats 1b. It will be understood that the outer surface of the seal ring 11, which is exposed to the outer periphery of the piston 1, is aligned same as the outer surface of the piston 1. In this way, the seal ring 11 seals the outer part of circular pressure room 1a.

The inner part of the pressure room 1a, that is, the inside of the piston 1 is connected to pressure lines 14 and 14a through which high pressure air from an external pneumatic source 15 is supplied to or drained from said pressure room 1a, said solenoid valve 12 being installed between the pressure lines 14 and 14a and external pneumatic source 15. Reference numeral 14b indicates a drain line of solenoid valve 12.

Operation and effect of the present invention will be described in detail as below. FIG. 1A illustrates the operating state of the piston with the present invention applied. In this state, the solenoid valve 12 is opened to the drain line 14b and accordingly no pneumatic pressure of the source 15 is transferred to the pressure room 1a in the piston 1. Hence the seal ring 11 which covers the pressure room is in a contraction state with the same surface alignment as that of piston 1. Therefore, when the piston moving, the gap G between piston is 1 and cylinder 2 is sealed only by both slide rings 10 which have a good lubrication characteristics. This results in the improvement of sliding friction characteristics of the periodically moving piston 1 and particularly in the elimination of the stick-slip phenomenon when the piston moves with low speed.

Also, to stop the piston 1 when operating in the manner as explained above, said solenoid valve 12 is switched into the mode in which the pneumatic pressure supplied from the source 15 is introduced into the pressure room 1a of piston 1 through said pressure lines 14 and 14a. Then as illustrated in FIG. 1B, the seal ring 11 is expanded outward to contact tightly with the cylinder 2 resulting in the effective sealing for said gap G and the pressure of the seal 11 generates a large braking power required to stop the piston rapidly.

FIGS. 2-3 show examples of the application of the piston seal device of the present invention to a pneumatic cylinder with a rodless piston and to a pneumatic cylinder with a rodded piston respectively.

For the pneumatic cylinder with a rodless piston as described in FIG. 2 small solenoid valves 12-1 and 12-2 are installed in both parts of piston 1 inside. The pressures P1 and P2 acting on each side of piston 1 in the cylinder 2 are transferred to the pressure room 1a through solenoid valves 12-1 and 12-2 and pressure lines 14-1 and 14-2. A steel belt 30 wound around pulleys 31 and 32 is connected to both ends of the piston 1 and a load transmission connector L is installed at the center of the belt to transfer the power of the piston 1. Brushes 33 and 34 are disposed at each side of the belt 30 exposed out of said cylinder 2 to transmit electrical signals D.S through steel belt 30 to actuate said solenoid valves 12-1 and 12-2. Electrical cables 35 and 36 are connected between solenoid valves 12-1 and 12-2 located inside the piston 1 and each end of steel belt 30 outside the cylinder 2.

With the embodiment described as above, once the piston 1 is operated by pressures P1 or P2 of cylinder 2 rooms, the steel belt 30 connected thereto is guided by pulleys 31 and 32 to move in both directions accompanied by the power transmission connector L mounted on the steel belt 30.

To stop the piston 1 which operates as in the above manner, electrical signals D.S are provided through brushes 33 or 34 to switch solenoid valves 12-1 or 12-2 into another selection mode. That is, the pneumatic pressure supplied to the pressure room 1a through solenoid valves 12-1 or 12-2 makes the seal ring 1 expand to achieve the required sealing and braking effects as explained above.

FIG. 3 shows the case of pneumatic cylinder piston equipped with a rod 40, in which electrical signals D.S for actuating solenoid valves 12- and 12-2 installed inside the piston 1 are transmitted through the cable prepared in the piston rod 40, and other mechanisms for sealing and braking are same as mentioned above.

As described above in detail, the device of the present invention comprises slide rings located on both sides of piston, made of material with good characteristics, and a seal ring located at the center of piston, which is operated by pneumatic pressure supplied through solenoid valve.

Since the device is embodied in such a manner that only slide rings of good friction characteristics are used when a piston moves, whereas the seal ring is brought to operation when it is required to brake the piston, the friction characteristics of the piston are improved considerably when the piston moves, and a complete elimination of the stick-slip phenomenon encountered in low piston speed is achieved as well. Together with these advantages, better sealing and braking characteristics are obtained by the seal device of the present invention when the piston is at rest.

What is claimed is:

1. A piston seal device for maintaining different pressures acting on each side of a piston a pneumatic cylinder, comprising
   slide rings made of material with good friction characteristics and located on peripheries of both sides of the piston;
   a seal ring located at the outer part of a pressure room formed along the periphery of central part of the piston and operated by pneumatic pressure of the pressure room; and
   at least two small solenoid valves for supplying selectively a pressurized air for operating the seal ring into the pressure room, said solenoid valves installed inside the piston and supplying pressurized air from the sides of the piston, whereby the sealing of the gap between the piston and the cylinder is accomplished by the use of slide rings when the piston is in operation, achieving the better sealing and braking effects by means of seal expansion when the piston is at rest.

2. A seal device for a piston of a pneumatic cylinder, comprising, in combination,
   at least two slide rings disposed on the periphery of the piston to provide a seal between the piston and the cylinder, the slide rings being fabricated of a material having a substantially low coefficient of friction,
   an expandable member disposed between the slide rings along the periphery of the piston to form a sealed pressure room between the expandable member and the piston, the expandable member being operable in response to changes in pressure within the pressure room,
   at least one solenoid valve disposed within the piston to selectively supply pressurized gas from one end of the piston to the pressure room to operate the expandable member whereby expansion of the expandable member operates to reduce movement of the piston within the cylinder.

3. The seal device as claimed in claim 2 further comprising electrical connections for supplying an electric signal to operate the valve.

4. The seal device as claimed in claim 3 further comprising a logic controller, the logic controller supplying the electric signal.

5. The seal device as claimed in claim 2 wherein the piston is a rodless piston.

6. The seal device as claimed in claim 2 wherein the piston has a rod.

7. The seal device as claimed in claim 2 wherein the expandable member is annular and provides a seal between the piston and the cylinder when the piston is at rest.

8. The seal device as claimed in claim 2 comprising first and second solenoid valves disposed within the piston to selectively supply pressurized gas to the pressure room, the first solenoid valve being connected to one end of the piston and the second solenoid valve being connected to the opposite end of the piston.

9. The seal device as claimed in claim 8 wherein the solenoid valve connected to the end of the piston disposed toward higher pressure is actuated to provide high pressure gas to the pressure room.

10. The seal device as claimed in claim 8 further comprising electrical connections for supplying an electric signal to operate the valve.

11. The seal device as claimed in claim 8 further comprising a logic controller, the logic controller supplying the electric signal.

12. The seal device as claimed in claim 8 wherein the piston is a rodless piston.

13. The seal device as claimed in claim 8 wherein the piston has a rod.

14. The seal device as claimed in claim 8 wherein the expandable member is annular and provides a seal between the piston and the cylinder when the piston is at rest.

* * * * *

UNITED STATES PATENT AND TRADEMARK OFFICE
CERTIFICATE OF CORRECTION

PATENT NO. : 5,079,997

DATED : January 14, 1992

INVENTOR(S) : Yeh-Sung Hong

It is certified that error appears in the above-identified patent and that said Letters Patent is hereby corrected as shown below:

ON THE TITLE PAGE:

Under Other Publications -"Seals and Sealing Handbood," the word "Handbood" should be -- Handbook --.

Column 1, line 13 after the word " and" add -- , --;

Column 2, line 46 "1" should be -- 11 --;

Column 2, line 46 after the word "Also" add --, --;

Column 2, line 50 "1a" should be -- 11a --;

Column 3, line 6 after " 10" add --, --;

Column 3, line 25 after "piston" add --, --;

Column 3, line 27 after "Fig.2" add -- , --;

Column 3, line 49 after "1" add --, --;

Column 3, line 54 "ring 1" should be -- ring 11 --;

Column 3, line 59 "12-" should be --12-1 --; and

Signed and Sealed this

Twentieth Day of April, 1993

Attest:

MICHAEL K. KIRK

*Attesting Officer*  *Acting Commissioner of Patents and Trademarks*